US012727013B2

(12) United States Patent
Breuer

(10) Patent No.: US 12,727,013 B2
(45) Date of Patent: Sep. 1, 2026

(54) METHOD FOR ENHANCED SCHEDULING OF NETWORK RESOURCES FOR REDUCED CAPABILITY USER EQUIPMENTS

(71) Applicant: Telit Cinterion Deutschland GmbH, Munich (DE)

(72) Inventor: Volker Breuer, Boetzow (DE)

(73) Assignee: Telit Cinterion Deutschland GmbH, Munich (DE)

(*) Notice: Subject to any disclaimer, the term of this patent is extended or adjusted under 35 U.S.C. 154(b) by 550 days.

(21) Appl. No.: 17/912,895

(22) PCT Filed: Mar. 29, 2021

(86) PCT No.: PCT/EP2021/058159
§ 371 (c)(1),
(2) Date: Sep. 20, 2022

(87) PCT Pub. No.: WO2021/198181
PCT Pub. Date: Oct. 7, 2021

(65) Prior Publication Data

US 2023/0145892 A1 May 11, 2023

(30) Foreign Application Priority Data

Apr. 1, 2020 (EP) .................................... 20167592

(51) Int. Cl.
*H04W 72/51* (2023.01)
*H04L 5/14* (2006.01)
*H04W 72/1263* (2023.01)

(52) U.S. Cl.
CPC ........... *H04W 72/51* (2023.01); *H04L 5/1469* (2013.01); *H04W 72/1263* (2013.01)

(58) Field of Classification Search
CPC .............. H04W 72/51; H04W 72/1263; H04L 5/1469; H04L 5/0094; H04L 5/1438; H04L 5/143
See application file for complete search history.

(56) References Cited

U.S. PATENT DOCUMENTS 5,841,766 A * 11/1998 Dent .................. H04B 7/18534 370/321
7,719,477 B1 * 5/2010 Sievenpiper ............ H01P 1/182 343/754

(Continued)

FOREIGN PATENT DOCUMENTS

| | | | |
|---|---|---|---|
| CN | 104956752 | A | 9/2015 |
| EP | 3244553 | A1 | 11/2017 |
| JP | 2018-511204 | | 1/2018 |

OTHER PUBLICATIONS

Holma, H., Povey, G. J., & Toskala, A. (Sep. 1999). Evaluation of interference between uplink and downlink in UTRA/TDD. In Gateway to 21st Century Communications Village. VTC 1999-Fall. IEEE VTS 50th Vehicular Technology Conference (Cat. No. 99CH36324) (vol. 5, pp. 2616-2620). IEEE. (Year: 1999).*

(Continued)

*Primary Examiner* — Hashim S Bhatti
*Assistant Examiner* — Christopher A. Reyes
(74) *Attorney, Agent, or Firm* — PEARL COHEN LLP

(57) ABSTRACT

Provided is a method to operate a base station that is part of a cellular network. The base station is configured to ascertain capability information from said reduced-capability user equipment indicating a capable uplink frequency bandwidth and a capable downlink frequency bandwidth. The method includes transmitting at least one first downlink signal for user equipment considering the received capability information, said first downlink signal indicating an assignment to a scheduled uplink frequency band, and scheduling information in the scheduled downlink frequency band for synchronously transmission in a predetermined nominal spacing to said scheduled uplink frequency band based on the center of the scheduled uplink frequency band and the scheduled downlink frequency band.

12 Claims, 3 Drawing Sheets

(56) References Cited

U.S. PATENT DOCUMENTS

| | | | | |
|---|---|---|---|---|
| 8,428,016 | B2 * | 4/2013 | Bhattad | H04L 5/0073 370/329 |
| 10,536,242 | B2 * | 1/2020 | Choi | H04J 11/00 |
| 2013/0143502 | A1 * | 6/2013 | Kazmi | H04W 88/06 455/62 |
| 2014/0314415 | A1 * | 10/2014 | Vassilieva | H04J 14/0298 398/76 |
| 2015/0312783 | A1 * | 10/2015 | Wakabayashi | H04W 76/27 370/241.1 |
| 2015/0334730 | A1 * | 11/2015 | Wakabayashi | H04W 24/10 370/329 |
| 2016/0323885 | A1 * | 11/2016 | Kazmi | H04W 76/27 |
| 2017/0012649 | A1 * | 1/2017 | Kummetz | H04B 7/022 |
| 2018/0077689 | A1 * | 3/2018 | Rico Alvarino | H04W 72/0453 |
| 2018/0124790 | A1 | 5/2018 | Yerramalli | |
| 2018/0255523 | A1 * | 9/2018 | Liu | H04L 5/0092 |
| 2018/0337752 | A1 | 11/2018 | Choi et al. | |
| 2019/0199456 | A1 * | 6/2019 | Chopra | H04B 17/309 |
| 2020/0106561 | A1 * | 4/2020 | Choi | H04L 5/1469 |
| 2020/0367251 | A1 * | 11/2020 | Saito | H04W 72/53 |
| 2023/0145892 | A1 * | 5/2023 | Breuer | H04L 5/143 370/329 |

OTHER PUBLICATIONS

International Search Report (PCT/ISA/210) and Written Opinion (PCT/ISA/237) mailed on Jun. 8, 2021 by the European Patent Office as the International Searching Authority for International Application No. PCT/EP2021/058159—[16 pages].

Ericsson: “New SID on support of reduced capability NR devices”, 3GPP Draft; RP-193238, 3rd Generation Partnership Project (3GPP), Mobile Competence Centre; 650, Route Des Lucioles ; F-06921 Sophia-Antipolis Cedex ; France—vol. TSG RAN, No. Sitges, Spain; Dec. 9, 2019-Dec. 12, 2019 Dec. 12, 2019 (Dec. 12, 2019), XP051840369.

RP-171137 “Status Report of WI on New Radio Access Technology; rapporteur: NTT Docomo” 43 3GPP, Jun. 5-8, 2017.

Wang Huayuan, “Joint Scheduling and Congestion Control in Mobil Ad-Hoc Networks”, IEEE Infocom 2008 Proceedings (Pre-publication) Nov. 16, 2008.

Juha Erkkila et al., “Antenna configuration comparison in challenging NLOS Locations”, 2017 European Conference on Networks and Communications (EuCNC) Jul. 17, 2017.

3GPP TS 36.101, 3rd Generation Partnership Project; “Technical Specification Group Radio Access Network; Evolved Universal Terrestrial Radio Access (E-UTRA); User Equipment (UE) radio transmission and reception” (Release 8), Dec. 2014.

3GPP TS 23.401, 3rd Generation Partnership Project; “Technical Specification Group Services and System Aspects; General Packet Radio Service (GPRS) enhancements for Evolved Universal Terrestrial Radio Access Network (E-UTRAN) access” (Release 14), Dec. 2019.

3GPP TS 36.331, 3rd Generation Partnership Project; “Technical Specification Group Radio Access Network; Evolved Universal Terrestrial Radio Access (E-UTRA); Radio Resource Control (RRC); Protocol specification” (Release 14), Sep. 2019.

3GPP TS 38.331, 3rd Generation Partnership Project; “Technical Specification Group Radio Access Network; NR; Radio Resource Control (RRC) protocol specification” (Release 15), Sep. 2019.

* cited by examiner

METHOD FOR ENHANCED SCHEDULING OF NETWORK RESOURCES FOR REDUCED CAPABILITY USER EQUIPMENTS

CROSS-REFERENCE TO RELATED APPLICATIONS

This application is a National Phase Application of PCT International Application No. PCT/EP2021/058159, International Filing Date Mar. 29, 2021, claiming priority to European Patent Application No. 20167592.3, filed Apr. 1, 2020, which is hereby incorporated by reference.

FIELD OF THE INVENTION

The present invention relates to a method to operate a base station. The invention also pertains to a base station using said method. The invention further relates to a method for a user equipment. The invention also pertains to user equipment using said method.

BACKGROUND OF THE INVENTION

In the field of wireless communication by now user equipments were known that are either operating the full bandwidth provided by a base station of the cellular network that they are working in, or only reduced bandwidth. For LTE devices supporting CAT-1 or higher, the full bandwidth is covered, while in Cat-M or NB-IoT only a subset of e.g. 1.4 MHz is processed. These are so-called bandwidth reduced (BR) devices.

This design had the drawback for bandwidth reduced devices that no full-duplex communication is possible. That means they are scheduled either for downlink operation or for uplink operation at the same time.

With the development of New Radio (NR) resp. 5G standard however there is the plan to remove this drawback and also allow user equipment that are not capable of operating the full bandwidth of a base station (in 5G a base station is called gNodeB) to operate in full-duplex mode. These are so so-called NR Light or NR-REDCAP (reduced-capability) devices, in the following generally reduced-capability user equipments.

For doing so a couple of amendments to the known inter-operation between user equipment and base station need to be made compared e.g. to the existing PDCCH monitoring rules.

One of the problems to be solved for fulfilling this new requirement is the scheduling on reserved frequency ranges in uplink and downlink. With a full-bandwidth device a processing of uplink and downlink transmissions are done for the whole bandwidth, and the scheduled PRBs for the user equipments are then further processed, while the others are discarded. The uplink and the downlink frequency ranges, at least for frequency domain (FDD) deployments have a known nominal spacing defined in the standard. Hence with e.g. the start of the frequency band e.g. for downlink and that nominal spacing the uplink frequency band is defined for the user equipment.

That approach does not work for bandwidth-reduced devices. Moreover it is not foreseen to reserve certain frequency regions for such devices, but rather apply scheduling distributed over the entire bandwidth which is provided by the gNodeB.

Therefore it needs a solution how to schedule the decodable frequency bands in the uplink and the downlink without a remarkable signalling overhead.

It is therefore the goal of present invention to propose a solution for an improved scheduling for bandwidth reduced user equipment.

Further alternative and advantageous solutions would, accordingly, be desirable in the art.

SUMMARY OF THE INVENTION

In a first aspect, the invention is embodied as a method for operating a base station. In a second aspect, the invention is embodied as a base station. In a third aspect, the invention is embodied as a method for operating a user equipment. In a fourth aspect, the invention is embodied as a user equipment.

In the first aspect of the invention it is proposed a method to operate a base station being part of a cellular network, the base station serving a plurality of user equipments, the base station operating at least in one supported frequency band in uplink direction and one in downlink direction, wherein the plurality of user equipments comprises at least one which is qualified as reduced-capability user equipment, wherein the base station is configured to ascertain capability information from said reduced-capability user equipment indicating a capable uplink frequency bandwidth and a capable downlink frequency bandwidth, wherein for scheduling the at least one reduced-capability user equipment the method comprises the steps for the base station of:

- transmitting at least one first downlink signal for said user equipment considering the received capability information, said first downlink signal indicating an assignment to a scheduled uplink frequency band,
- scheduling information in the scheduled downlink frequency band for synchronously transmission in a predetermined nominal spacing to said scheduled uplink frequency band based on the center of the scheduled uplink frequency band and the scheduled downlink frequency band.

The inventive method relates to a base station of a cellular network, in particular implementing the wireless technology standards of 3G, 4G or beyond. The base station is capable of serving reduced-capability user equipments, that are supposed to register and camp on said base station.

A reduced-capability user equipment is defined by the fact that it is not capable of processing the full frequency band deployed by the base station, in particular due to limited hardware resources. In effect only a capable frequency bandwidth can be addressed, preferably both in uplink (UL) and in downlink (DL) direction.

In this constellation the following terms are to be distinguished:

The supported frequency band (in UL and DL) describe what the base station can provide. So it is effectively the maximum range where uplink or downlink communication is possible. It is basically a certain range, in particular defined by the starting frequency and the length, that is the bandwidth.

That supported frequency band is for uplink and downlink in different ranges for FDD deployments, while it is the same range in TDD deployments.

The capable frequency bandwidth (in UL and DL) describes the bandwidth the user equipment can process. As this defines bandwidth-reduced devices, this capable frequency bandwidth is smaller than the bandwidth of the supported frequency band of at least one base station the user equipment wants to operate with.

In contrast the scheduled frequency band (in UL and DL) defines what and where in the supported frequency band the capable frequency bandwidth of the user equipment shall be used for UL/DL transmissions with the base station.

In order to serve a reduced-capability user equipment the base station needs to carry out a scheduling.

Additionally for reduced-capability user equipment a duplex operation is expected to be operable, which means in parallel uplink and downlink data exchange to be scheduled, transmitted and processed. This is in line with the deployment of NR-Light resp. NR-REDCAP in the definition of the technology standard of NR (New Radio) resp. 5G.

Preferably the base station will not restrict itself to define a certain area of the full supported frequency band for that user equipment, due to the fact that the data exchange sessions may last long with low payload exchange. This would block the base station from serving other, in particular fully capable, user equipments.

This is where the inventive method comes into play. According to the invention method the solution is carried out by the following method steps.

As a precondition the base station first ascertains capability information from the respective reduced-capability user equipment. This is in particular carried out at the time of registration, or in conjunction with a request for opening a data exchange session resp. context.

With this capability information the base station gets at least an indication relating to the capable uplink frequency bandwidth and the capable downlink frequency bandwidth. This is typically indicated by a value in terms of size in MHz.

Alternatively or additionally a number of subcarriers, in particular in case of variable subcarrier spacing, is submitted as said indication. The number of supported subcarriers regardless of the applied spacing—in case it is homogenous—is a measure for the parallel processing capabilities in the user equipment, i.e. number of subcarriers which can be processed in parallel. The larger the spacing, the smaller the symbol/frame duration and the faster the processing time/speed in the user equipment needs to be for a given throughput.

The indication of the capability information might comprise only the capable uplink or downlink frequency bandwidth, which is directly or indirectly applied to the other directions bandwidth. Hence it might suffice to transmit one value for indicating the capable uplink frequency bandwidth and the capable downlink frequency bandwidth. Preferably the user equipment provides along with said capability information other information relating to general user equipment capabilities.

This exchange is carried out during registration procedure of the user equipment at the base station. It is in particular submitted in response to a capability request of the base station in course of said registration. An initial submission by the user equipment is however also encompassed by the inventive method.

Preferably on occasion of a data exchange session, the base station transmits at least one first downlink signal to the user equipment. In this it is indicated the scheduled downlink frequency band for the next imminent data exchange session.

This scheduled downlink frequency band is determined considering the capability information received earlier from the user equipment. In particular the capable downlink frequency bandwidth of said reduced-capability user equipment is taken into account for determining the scheduled downlink frequency band.

This information is at least meant to inform about the frequency band which needs to be monitored by the user equipment, as physical resource blocks (PRB) or symbols designated for the user equipment might by transmitted. Generally by now it is known that a user equipment can decode and process the whole frequency band deployed by a base station. Hence, anywhere in a PRB or Master Information Block (MIB) the control information may be transmitted indicating where signaled data, like payload data, are transmitted that are dedicated for said user equipment.

For reduced-capability user equipment this approach is not feasible anymore. Hence with this first downlink signal the user equipment is informed about which frequency band window it has to monitor for the coming data exchange session.

The first downlink signal however needs to be transmitted in a frequency range that is monitored by the user equipment.

According to a preferred embodiment it is suggested that the transmitting the first downlink signal is carried out:

- according to a predetermined proximity around the master information block, or
- as announced by the base station in a broadcast signalling, or
- in a fraction of the supported downlink frequency band identified by a hopping sequence considering a user equipment specific element, or
- in a fraction of the supported downlink frequency band identified by a hopping sequence considering a frame timing relation.

With this embodiment it is assured that the reduced-capability user equipment can receive the first downlink signal.

In a preferred first option this first downlink signal is transmitted in a predetermined range around the master information block, resp. the broadcast channel BCH. The user equipment is anyhow expected to read the BCH and/or MIB, and consequently it is tuned to receive this range.

Hence it is preferably to use this range also for submitting said first downlink signal.

Alternatively or additionally the base station sends in the broadcast signalling, in particular as part of system information, where in the supported downlink frequency band of the base station the first downlink signal is transmitted. This option also takes into account that the user equipment is tuned on the MIB, and will therefore under any circumstances notice this first downlink signal.

It is advantageous as the area around the MIB is usually quite well populated. Further this allows for smaller capable downlink frequency bands an appropriate and sufficiently large area. Should the user equipment only be capable of retrieving the size of the MIB—which is the smallest size a reduced-capability user equipment needs to be capable of receiving and decoding—then there is no room for the first downlink signal.

As a third option it is proposed to submit the first downlink signal in a fraction of the supported downlink frequency band identified by a hopping sequence considering a user equipment specific element.

This elaborated approach defines a hopping sequence, which considers a user equipment specific element, like an ID—e.g. the IMEI—or any other element, that determines the hopping sequence. Both the user equipment and the base station can derive from said user equipment's specific element the hopping sequence in time and therefore both have knowledge in which fraction of the supported downlink frequency band of the base station the user equipment needs to monitor for the first downlink signal.

As a variant of the third option the fourth option also defines a hopping sequence. However this is identified by means of considering a frame timing relation, i.e. frame numbers or connection timing.

This frame timing relation could relate to the SFN (system frame number), that means either the SFN itself or used in a calculation like modulo with predefined values.

Such predefined value may be the supported frequency bandwidth of the base station dived by the capable frequency bandwidth of the user equipment, rounded to the smaller integer.

Further the SFN modulo may use the IMEI of the user equipment or a derived value thereof.

This variant could also consider the CFN, which is the connection frame number. This depicts when the connection was established, starting with 0, and counting system frames thereafter.

The third and/or the fourth option comprises considering said resulting number e.g. as a number of positions for the scheduled frequency band. Hence it is possible to determine a hopping in a special order, which is the individual hopping sequence for said user equipment.

Other options or combinations of the mentioned options are also possible as part of this invention to make sure that the user equipment receives the first downlink signal.

Said first downlink signal indicates an assignment to a scheduled uplink frequency band, in short the uplink assignment.

Such indication is preferably send with the first downlink signal, or at least within the frequency band for the first downlink signal.

Additionally or alternatively such indication is indirectly carried out with the first downlink signal.

According to that said step of transmitting at least one first downlink signal comprises indicating a scheduled downlink frequency band, and transmitting within said scheduled downlink frequency band said assignment to the scheduled uplink frequency band.

With that the first downlink signal indicates a scheduled downlink frequency band. Within said scheduled uplink frequency band, the user equipment monitors for further transmissions dedicated for the user equipment. Such transmissions may comprise downlink payload data for the user equipment. Within this scheduled downlink frequency band it is submitted a signal which comprises said uplink assignment to a scheduled uplink frequency band. With that uplink assignment the user equipment can derive in which uplink frequency band it may carry out uplink transmissions.

However due to the fact that a duplex data transmission is foreseen, at the same time of the uplink transmission additional downlink data transmissions may be carried out, and which consequently need to be monitored by the user equipment. In fact it cannot be sure that this will remain in the scheduled downlink frequency band as indicated with the first downlink signal. The base station may schedule this in a completely different area of the supported downlink frequency band of the user equipment.

Therefore the scheduling is carried out that way, that in dependence of the scheduled uplink frequency band the synchronously scheduled downlink frequency band is available in a predetermined nominal spacing.

This predetermined nominal spacing is preferably a constant value known by the user equipment and the base station, and in particular predefined in the standard definition.

The predetermined nominal spacing is applied from the center of the scheduled uplink frequency band and therefore leads to the center of the resulting scheduled downlink frequency band.

This is advantageous as the scheduled uplink and downlink frequency band will most likely differ in size. Therefore the nominal spacing applied to the center of the respective frequency range assures that the frequency bands will be well distributed.

In particular the so called duplex spacing defined as a fixed value in 3GPP TS 36.101 may be applied here. This applies in particular for frequency division duplex operation.

According to a preferred embodiment in case of operation of the base station in time domain duplex (TDD), the nominal spacing is zero.

That means for TDD operation the scheduled uplink frequency band and the scheduled downlink frequency band is identical, the uplink and downlink transmission is separated by time, and not frequency.

With that approach of the inventive method it is assured that continuously without additional signalling a parallel, uplink and downlink scheduling can be applied, and the reduced-capability user equipment safely can monitor scheduled downlink data.

In a further preferred embodiment it is suggested the step of determining if the scheduled downlink frequency band protrudes the supported downlink frequency band, if so amending the scheduling by shifting the scheduled downlink frequency band to the edge of the supported downlink frequency band.

This embodiment covers the situation that may appear when the scheduled downlink frequency band is larger in size than the scheduled uplink frequency band.

In that case a deployment of the scheduled uplink frequency band close to the edge of the fully supported uplink frequency band of the base station will lead to the situation that the parallel downlink frequency band—which is deployed in the predetermined nominal spacing—will protrude the edge of the supported downlink frequency band.

This is on the first disadvantageous as this would reduce the total usable size of the scheduled downlink frequency band. Second it shall be assured that the whole supported uplink frequency band of the base station shall be usable for scheduling of the reduced-capability user equipment. Third it is advantageous to deploy at the edge of the supported downlink frequency band, as this assures that the scheduling area does not overlap with the MIB.

In this embodiment this situation is covered first by detecting this situation. This is easily done by calculating the resulting scheduled downlink frequency band from the scheduled uplink frequency band, in particular by considering the capable frequency bandwidth of the user equipment as maximum (and default) bandwidth to monitor.

If this situation is detected it is solved by amending the scheduling for the downlink, by shifting the scheduled downlink frequency band to the edge of the supported downlink frequency band of the base station for the downlink transmissions.

In that sense the predetermined nominal spacing does not apply anymore, but that is a safe and robust operation mode for both the user equipment and the base station, that it can be assured that the whole scheduled frequency band may be used.

According to another preferred embodiment it is proposed that that after conducting an uplink transmission considering said scheduled uplink frequency band a second scheduled downlink frequency band is determined considering at least one out of:

said predetermined proximity around the master information block (MIB), said broadcast signalling, said fraction of the supported downlink frequency band identified by said hopping sequence, the previously used scheduled downlink frequency band.

This embodiment relates to the situation that when a user equipment that carried out uplink data transmissions finished the uplink data transmission, and therefore did not request further scheduled uplink frequency bands.

Hence there may be no uplink assignment, where with the nominal spacing the scheduled downlink frequency band can be derived.

It would be disadvantageous to provide uplink assignments which are not requested, only to derive the scheduled downlink frequency band from it. This would waste resources of the base station.

Hence it is suggested to derive the scheduled downlink frequency band for further monitoring of downlink transmission to the user equipment from other measures.

At first, here the same options apply that are used for the first downlink signal. Alternatively the previously scheduled downlink frequency band is maintained. Though it is disadvantageous to allocate in a fixed manner the area for the user equipment for a longer duration, it is however advantageous to maintain it for assuring that e.g. a HARQ procedure is completed. As a HARQ process requires potentially repetition of data transmissions, it is advantageous to assure that this is carried out on the same scheduled downlink frequency band, and therefore easily and safely receivable by the user equipment.

After the HARQ process is completed—either with a successful termination or after a timeout failure—it is advantageous to assure that also in another frequency band downlink scheduling for this user equipment may take place. Therefore also a combination of the mentioned options is suggested as part of this embodiment.

According to the second aspect of the invention it is proposed a base station being part of a cellular network, the base station being configured to serve a plurality of user equipments, the base station operating at least in one supported frequency band in uplink direction and one in downlink direction, wherein the plurality of user equipments comprises at least one which is qualified as reduced-capability user equipment, wherein the base station is configured to ascertain capability information from said reduced-capability user equipment indicating a capable uplink frequency bandwidth and a capable downlink frequency bandwidth, wherein for scheduling the at least one reduced-capability user equipment the base station is configured to:

transmit at least one first downlink signal for said user equipment considering the received capability information indicating an assignment to a scheduled uplink frequency band, schedule information in the scheduled downlink frequency band for synchronously transmission in a predetermined nominal spacing to said scheduled uplink frequency band based on the center of the scheduled uplink frequency band and the scheduled downlink frequency band.

This aspect of the invention relates to a base station for serving a plurality of user equipments.

The base station is part of a cellular network which preferably comprises a plurality of base stations. Such are implementing in particular one or more of the cellular wireless communication technology standards of 2G, 3G, 4G, 5G or beyond. Depending on the implemented technology standards the base stations are named gNodeB, eNodeB, nodeB, base station etc.

A base station is the cellular network equipment for carrying out the direct communication over the air interface with the user equipments that are operating in the cellular network. Preferably the base stations are additionally connected to other cellular network components, in particular as part of the core network or the respective radio access network. Indirectly each base station is connected to each other base station via such cellular network components.

The base station comprises transmitting and receiving circuitry, combined with at least one antenna for conducting the wireless communication over the air interface.

It further comprises processing circuitry, for controlling the transmitting and receiving circuitry according to the communication protocol of the implemented technology standard(s).

Additionally a base station is preferably equipped with at least one memory unit, preferably a volatile and/or a permanent memory. This is for holding the operating system software, configuration data, for caching and logging etc. The base station is configured to populate at least one frequency bandwidth, which is called hereinafter the supported frequency band. Depending upon if the base station implements the Time Division Duplex (TDD) or Frequency Division Duplex (FDD) variant of the respective standard, there are common (TDD) or separate supported frequency bands for the uplink and the downlink direction.

In particular the separate supported frequency band for uplink and downlink are deployed in a predefined frequency distance called the nominal spacing. This is in particular a predefined value in the respective technology standard. The base station is capable of serving reduced-capability user equipments. These are those that are not capable of processing the full supported frequency band of the base station in at least one of the uplink or downlink direction.

For doing so the base station is configured to ascertain capability information from a served reduced-capability user equipment, in particular indicating the capable uplink frequency bandwidth and/or the capable downlink frequency bandwidth. This may be the same value for both directions, or alternatively differ.

Based on that the base station is configured to carry out a scheduling for the respective user equipment and provide information where in the supported frequency band the scheduling for that user equipment will be provided. Such a range may at maximum have the size of the capable uplink resp. downlink frequency band.

The second aspect shares the advantages of the first aspect of the invention.

According to the third aspect of the invention it is suggested a method for a user equipment capable of operating with one of a plurality of base station of a cellular network, hereinafter the serving base station, said user equipment being qualified as reduced-capability user equipment, said user equipment maintaining a capable uplink frequency bandwidth and a capable downlink frequency bandwidth, the method comprising the steps of:

submitting capability information to the serving base station, receiving at least one first downlink signal from the serving base station, deriving from the first downlink signal the assignment to a scheduled uplink frequency band, determining the scheduled downlink frequency band by considering a predetermined nominal spacing to the center of the scheduled uplink frequency band and the scheduled downlink frequency band, synchronously monitoring the scheduled downlink frequency band for signals from the base station and transmitting at least one signal to the base station using the scheduled uplink frequency band.

This aspect of the invention relates to a method for a user equipment which is supposed to operate with a base station according to the second aspect of the invention.

The user equipment is qualified as reduced-capability user equipment, which means that it is not capable to process the full supported frequency band of the base station. Hence it needs to operate differently, with support of the base station, in order to assure continued service. This includes also a full duplex operation.

The user equipment maintains the capable uplink and downlink frequency bandwidth, which is the frequency range that can be handled by the user equipment, in particular due to the physical equipment with processing power and the transceiver.

Therefore according to this method the user equipment makes available the capability information regarding the capable uplink and downlink frequency to the serving base station, which is the base station where the user equipment is currently camping on.

This is preferably happening when starting to camp on the base station, or upon registration. Additionally or alternatively this information may be received by the base station from another base station, in particular one where the user equipment was camping on before.

For carrying out a data exchange session the user equipment needs to monitor the supported frequency band of the user equipment, in particular in the downlink. But as the user equipment is incapable to monitor the whole supported frequency band, it needs a scheduling indication, which depicts the range of the supported frequency band of the base station, where scheduled information for the user equipment need to be expected.

This is achieved by receiving a first downlink signal from the serving base station. This is submitted in a preferably predefined area where the user equipment by default is monitoring.

In the first downlink signal the user equipment further retrieves an assignment to scheduled uplink frequency band. That is the frequency range where the user equipment may transmit its data transmissions to the base station. Alternatively with the first downlink signal it is indicated a scheduled downlink frequency area, and within said scheduled downlink frequency area the assignment to a scheduled uplink frequency band is transmitted.

The assignment in particular is done to the center of the scheduled uplink frequency band.

The user equipment additionally needs to figure out for downlink communication, which is expected to happen in parallel to potential uplink data transmissions, where such additional downlink scheduling is supposed to happen. It is no option to constantly remain at the scheduled frequency band for the first downlink signal.

However it is also disadvantageous to signal both the assignment to the scheduled uplink frequency band and an assignment to the in parallel scheduled downlink frequency band, as this would increase the signalling for the base station to this comparably low-priority user equipment.

Therefore the method foresees that the user equipment derives from the scheduled uplink frequency band indication the parallel scheduled downlink frequency band by means of a predetermined nominal spacing.

This nominal spacing is known to the user equipment and the base station. It is in particular assigned to the center of the scheduled uplink frequency band and depicts the center of the scheduled downlink frequency band.

With that the inventive method advantageously achieves a reliable way for the reduced-capability user equipment to be scheduled by the base station for duplex communication. This is achieved with a low impact in terms of signalling for the cellular network and power consumption for the user equipment. Further embodiments are foreseen.

According to the fourth aspect of the invention it is proposed a user equipment capable of operating with one of a plurality of base station of a cellular network, hereinafter the serving base station, said user equipment being qualified as reduced-capability user equipment, said user equipment maintaining a capable uplink frequency bandwidth and a capable downlink frequency bandwidth, the user equipment being configured to:

submit a capability information to the serving base station, receive at least one first downlink signal from the serving base station, derive from the first downlink signal the assignment to the center of a scheduled uplink frequency band, determine the scheduled downlink frequency band by considering a predetermined nominal spacing to the scheduled uplink frequency band and the scheduled downlink frequency band, synchronously monitor the scheduled downlink frequency band for signals from the base station and transmit at least one signal to the base station using the scheduled uplink frequency band.

This aspect of the invention relates to a user equipment.

The user equipment is capable of operating with a base station according to the second aspect of the invention. It is a reduced-capability user equipment. The user equipment comprises transmitting and receiving circuitry that—in conjunction with at least one antenna—conduct wireless communication over the air interface with at least one base station, in particular the serving base station.

Preferably the transmitting and receiving circuitry in the user equipment is incorporated in a transceiver. Further it is advantageous to equip the user equipment with a wireless modem, which holds the transmitting and receiving circuitry, resp. the transceiver, and all other hardware and software components necessary to carry out the wireless communication with the base station. That wireless modem is preferably further equipped with a call interface where the application part of the user equipment may control the communication.

The user equipment further comprises at least one processing circuitry, preferably a central processing unit (CPU) or/and a base band processor. This at least one processing circuitry is configured for controlling the transceiver for carrying out the wireless communication. Further it is preferably configured to carry out the application logic, which might depending on the type of user equipment comprises handling of a user interface, collection and processing of measurement values in order to submit them to a remote server, handling of information or instructions received through the wireless communication connection etc.

The user equipment further comprises a memory unit, for volatile or permanent storing operating software, communication protocol software, configuration data, application data etc.

The fourth aspect shares the advantages of the third aspect of the invention.

As it is shown this invention advantageously solves the depicted problem and proposes a reliable approach for full duplex communication of reduced-capability user equipments with a base station, without remarkable drawbacks, or additional signalling efforts.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 schematically shows a user equipment UE operating with a base station BS being part of a cellular network CN. The base station BS is in particular configured to comply with the cellular wireless communication standards of 2G, 3G, 4G, 5G and/or beyond.

Figure 1:
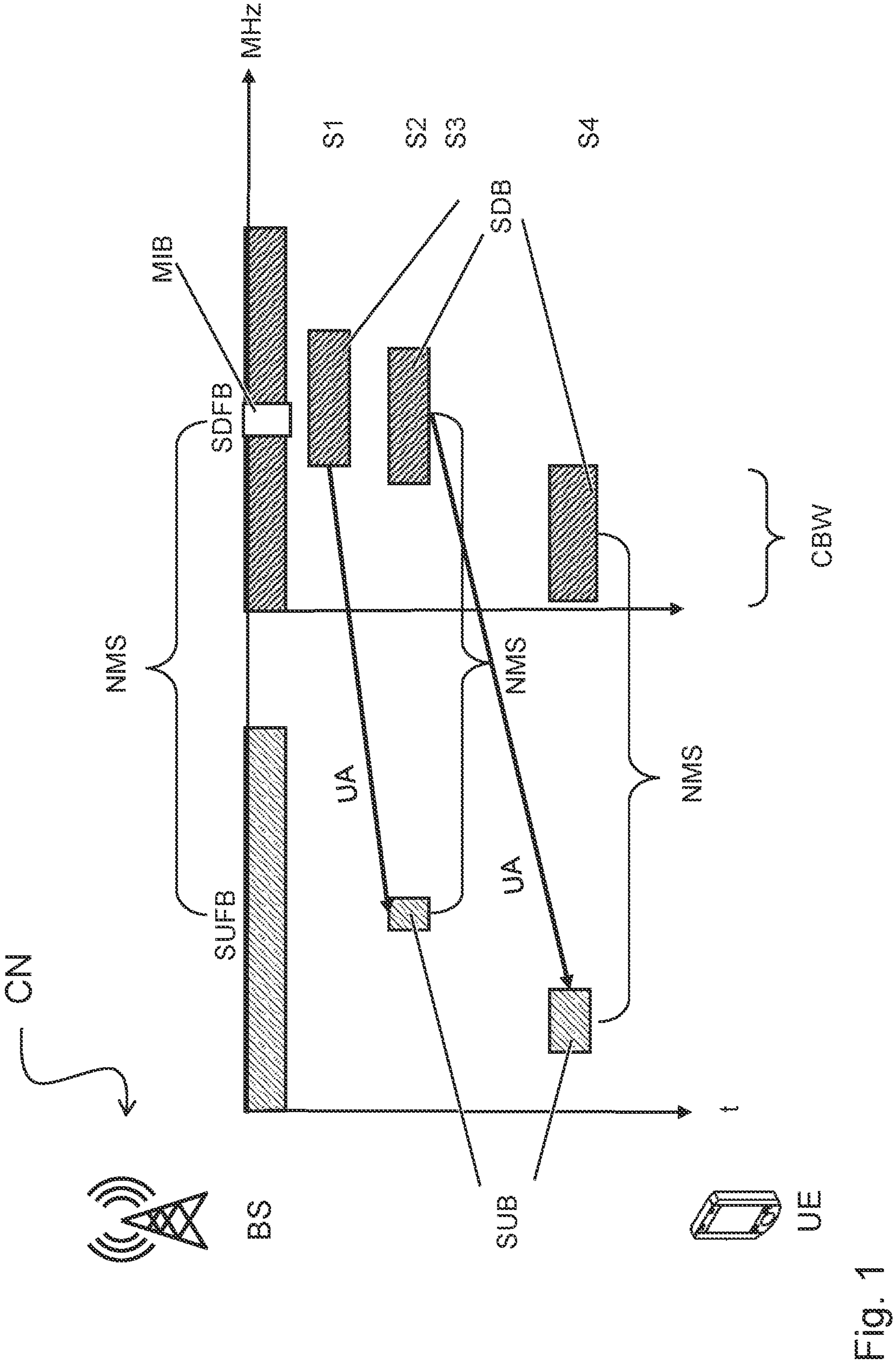
FIG. 1 represents a first exemplifying scheduling of uplink and downlink communication between a base station and a user equipment of the type to which the present invention is applied as an embodiment.

The user equipment UE is camping on the base station. It is a reduced-capability user equipment, which means it is not capable to process the full supported downlink frequency band SDFB and/or the supported uplink frequency band SUFB of the base station BS. In the context of 5G resp. NR such reduced-capability devices are called NR light or NR-REDCAP. This implies that the reduced-capability user equipment is expected to operate in full duplex, regardless of the reduced-capability qualification. This makes this deployment different to e.g. NB-IoT, where no duplex signalling is possible. The base station BS is aware of the capable frequency bandwidth CBW of the user equipment UE, which preferably was exchanged during the initial process of camping on the base station as part of the capability information.

The horizontal axis depicts the frequency where the deployment of the base stations BS supported frequency bands SDFB and SUFB are shown. Here it is shown a frequency division duplex (FDD) deployment, that means the supported uplink and the downlink frequency bands are separated.

This separation is not arbitrary, but in a predetermined fixed distance depicting the nominal spacing NMS. This fixed nominal spacing NMS is preferably derived from the respective implemented technology standard, like for LTE 3GPP TS 36.101.

For serving a reduced-capability user equipment UE the base station BS is carrying out the following steps, shown in vertical order, indicating the time. That means, what is in the same height, it is supposed to happen more or less in parallel.

First in step S1 the base station BS considers in a certain range, which can be decoded by the camping at least one reduced-capability user equipment—therefore complying with the capable frequency bandwidth CBW of the user equipment—that said at least one user equipment will monitor signals dedicated for said user equipment.

Preferably this—at least for LTE deployment—is deployed in close proximity to the master information block MIB, which needs to be read by any camping user equipment anyway, at least for receiving always up to date system information and any other broadcasted information.

Within this scheduled range the base station BS sends for an imminent data transmission session a first downlink signal for said user equipment UE indicating an uplink assignment UA for a scheduled uplink frequency band SUB. This is an indication where in the supported uplink frequency band SUFB of the base station BS the user equipment UE may carry out data transmission. Such data transmission are expected to happen in parallel to a downlink data transmission from the base station BS, which the user equipment UE is expected to monitor.

For that it requires to make available the scheduled downlink frequency band SDB for the next time period, as this does not stay constant.

This is achieved from the base station BS by a deployment of the scheduled downlink frequency band SDB in a constant distance according to the nominal spacing NMS to the scheduled uplink frequency band SUB.

So in step S2 both scheduled frequency bands in the uplink and the downlink direction are deployed and supposed to be monitored by the user equipment in the downlink and used for data transmission in the uplink.

At least one indication is transmitted by the base station as indicated in step S3. Here another uplink assignment UA is signalled to the user equipment UE within the scheduled downlink frequency band SDB.

This is following a new scheduling for the next time period, where the deployment for this user equipment UE may change.

As it is shown for the uplink transmission the uplink assignment UA for step S4 shows a scheduled uplink frequency band SUB in a completely different area of the supported uplink frequency band SUFB.

Consequently also the scheduled downlink frequency band SDB is moved taking into account the nominal spacing NMS.

With that embodiment it is shown in an exemplifying manner the regular scheduling conducted by the base station BS, made available for the user equipment to be always assured that a limited range complying with the capable frequency bandwidth CBW of the user equipment is used for scheduling purposes.

Figure 2:
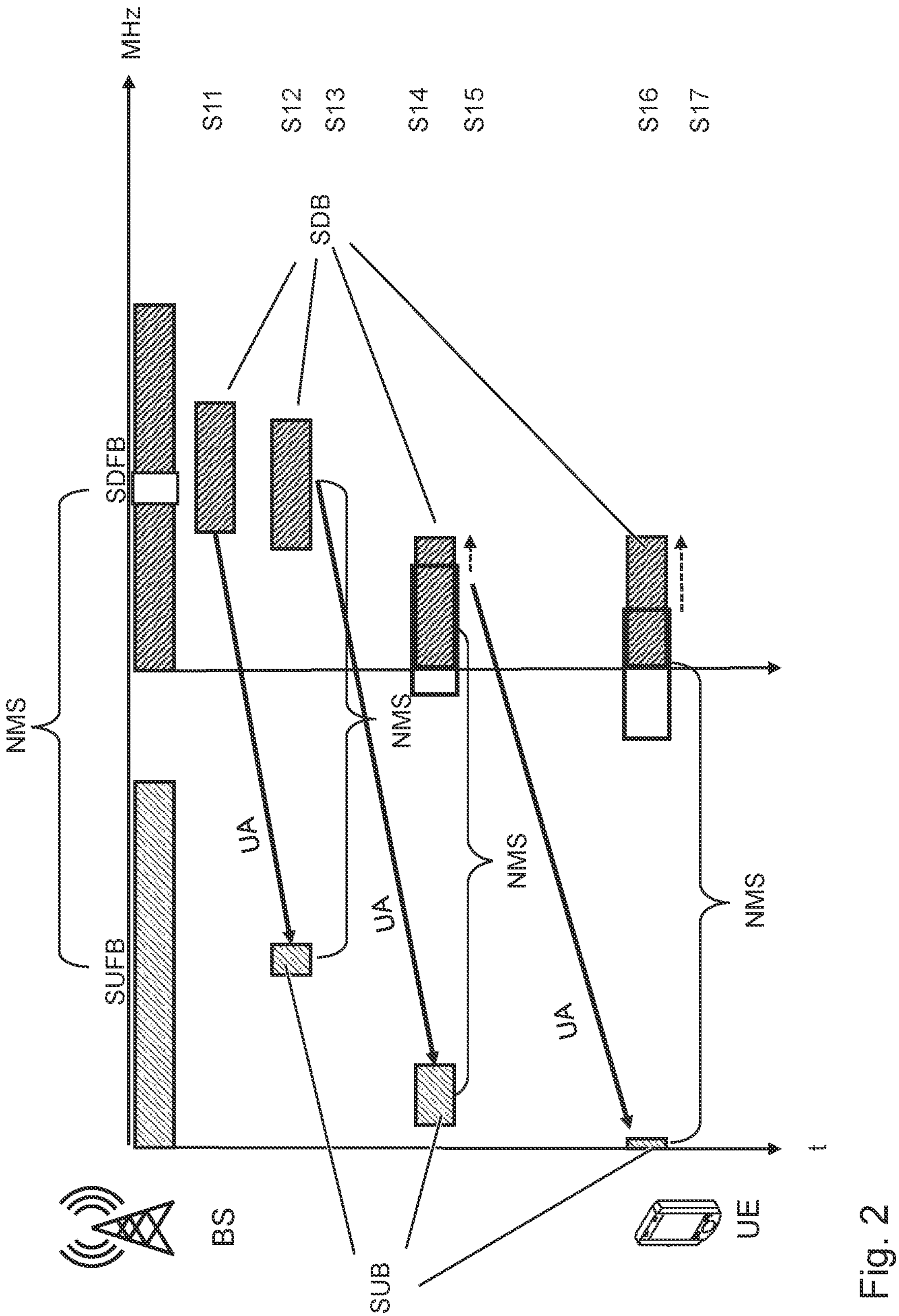
FIG. 2 represents a second exemplifying scheduling of uplink and downlink communication of the type to which the present invention is applied as an embodiment.

In FIG. 2 it is shown a second example of the invention applied in a similar way as before.

Steps S11-S14 more or less correspond to the steps S1-S4 of FIG. 1.

In S13 it is however indicated with the uplink assignment UA a scheduled uplink frequency band SUB comparably close to the edge of the supported uplink frequency band of the base station. Due to the total size of the frequency bandwidth it fully fits into the supported uplink frequency band.

However the corresponding parallel scheduled downlink frequency band SDB is larger in size than the scheduled uplink frequency band SUB. This leads due to the fixed distance of the nominal spacing NMS, that as shown in step S14 parts of the scheduled downlink frequency band SDB protrude the edge of the supported downlink frequency band SDFB.

In that situation in step S15 the scheduled downlink frequency band SDB is shifted to the edge of the supported downlink frequency band SDFB. This assures that the whole scheduled downlink frequency band may be used in that step, in order to assure the possible data throughput, if needed.

This effect becomes in particular apparent with the next deployed scheduled uplink frequency band SUB in step S16. According to the uplink assignment UA this is deployed right at the edge of the supported uplink frequency band SUFB. And moreover it is remarkably small, which might be due to a low amount of requested resources for uplink transmissions by the user equipment UE.

This leads to the effect that by applying the nominal spacing NMS practically half of the resulting scheduled downlink frequency band SDB is lying outside of the supported downlink frequency band SDFB.

In step S17 this is mitigated by shifting again the resulting scheduled downlink frequency band SDB to the edge of the supported downlink frequency band SDFB.

This exemplifying embodiment shows, that it is reliably assured that the scheduling in up- and downlink direction is fully usable for the user equipment UE.

Figure 3:
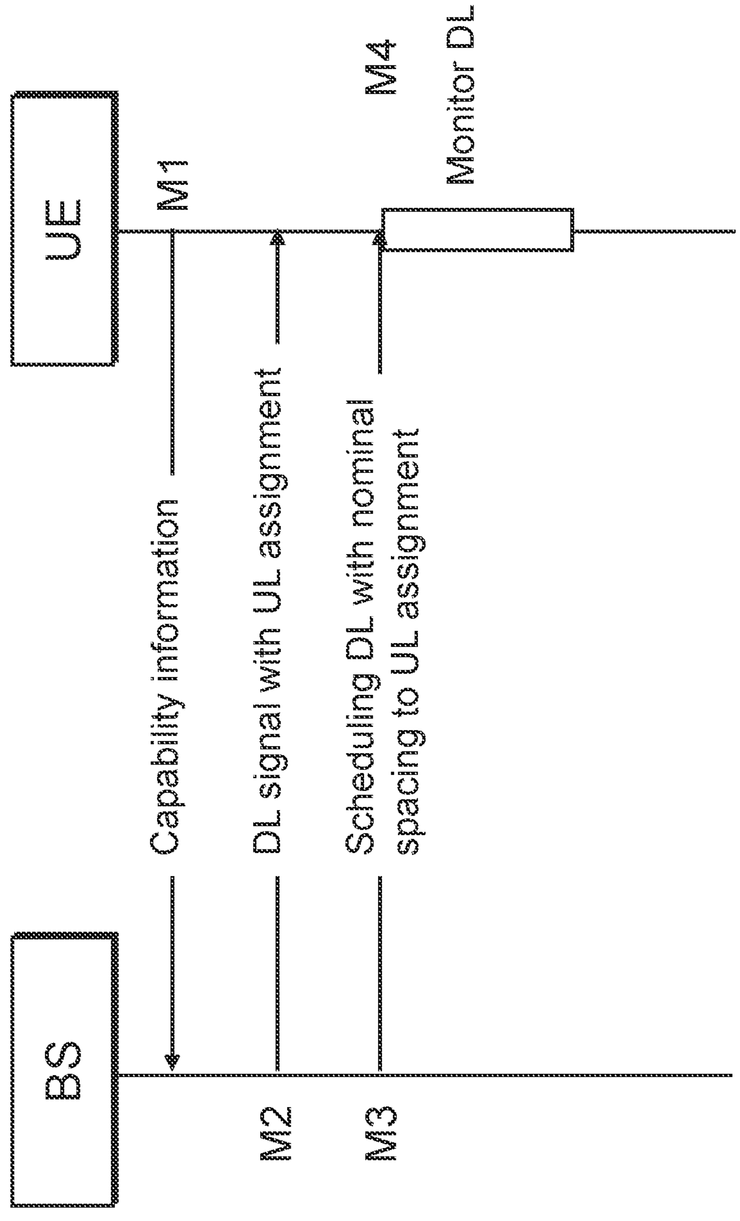
FIG. 3 shows a sequence diagram according to an exemplifying embodiment of the invention.

FIG. 3 shows a sequence diagram indicating the signalled messages between user equipment UE and base station BS in an exemplifying embodiment of the invention.

The sequence starts with message M1, in particular in course with the procedures carried out for camping on the base station, wherein the user equipment sends capability information to the base station.

In particular during registration procedure of the user equipment UE, the base station issues a UE capability request to the user equipment. Said capability request is issued by the cellular network if user equipment capabilities have not been forwarded by the previous serving base stations. In case of an initial attach the user equipment sends its capabilities as part of the network registration procedure to the base station.

In LTE in general user equipment's capabilities are maintained in the MME, i.e. being part of the NAS procedure TS23.401 and carried out via RRC procedures TS36.331 e.g. If the user equipment has changed its E-UTRAN radio access capabilities, it shall request higher layers to initiate the necessary NAS procedures (see TS 23.401) that would result in the update of user equipment's radio access capabilities using a new RRC connection. Likewise method for NR exists involving TS 38.331, TS.23.401 and the communication is done by means of the AMF (Access and Mobility Management Function). In response or alternatively as initial registration the user equipment submits with the UE capability message M1 its capabilities to the base station. The UE capability message M1 comprises all information relating to UE capabilities. This relates in particular to all capable frequency bands of the user equipment, both in the uplink and the downlink.

Directly after this message M1, or after some waiting time, in particular when a data transmission session becomes due, the base station BS sends with message M2 a first downlink signal to the user equipment. The user equipment knows which frequency range to monitor for such downlink signal message from the base station based on previously acknowledged or defined information, e.g. in proximity to the master information block MIB.

Part of the downlink signal M2 is an uplink assignment UA. Based on the uplink assignment UA the user equipment knows where in the supported uplink frequency range of base station BS it may carry out uplink transmission.

In this embodiment no uplink transmission are due, therefore no signals/messages are sent from the user equipment to the base station. However the base station needs to carry out parallel downlink transmissions to the user equipment. These need to be scheduled and the user equipment UE needs to know where these downlink transmissions are scheduled.

This is achieved indirectly through the uplink assignment UA which was submitted with message M2. With applying a constant nominal spacing on the center of the uplink assignment UA the user equipment UE can easily derive the center of the scheduled downlink frequency band SDB. For that the user equipment UE applies the entire capable frequency bandwidth CBW. However due to other distribution rules only a part of the scheduled downlink frequency bandwidth SDB may be used for scheduling indication by the base station BS, and hence the user equipment UE only listens to that fraction of its capable frequency band CBW. Such measures are e.g. in LTE known where all camping user equipments UE are distributed over the capable supported frequency range, so that each user equipment listens equally often to each frequency range, and each frequency range is equally often used for scheduling for all user equipments UE.

If the scheduled downlink frequency band SDB is fully positioned within the supported downlink frequency band SDFB of the base station BS, then the user equipment UE is prepared to monitor the data transmissions of the base station BS within the scheduled downlink frequency band SDB with message M3, until data dedicated for the user equipment are submitted.

With message step M4 the user equipment UE carries out said monitoring and decodes signals or data packets dedicated for the user equipment UE.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method to operate a base station (BS) that is part of a cellular network (CN), the base station serving a plurality of user equipments (UE), the base station (BS) operating at least in one supported uplink frequency band in uplink direction (SUFB) and one supported downlink frequency band in downlink direction (SDFB), wherein the plurality of user equipments comprises at least one which is qualified as reduced-capability user equipment, wherein the base station (BS) is configured to ascertain capability information from said reduced-capability user equipment, the capability information indicating a capable uplink frequency bandwidth and a capable downlink frequency bandwidth (CBW), wherein for scheduling the at least one reduced-capability user equipment (UE), the method comprises by the base station (BS):

transmitting at least one first downlink signal for said user equipment (UE) considering the received capability information, said first downlink signal indicating an assignment (UA) to a scheduled uplink frequency band (SUB), scheduling information in a scheduled downlink frequency band (SDB) for synchronously transmission in a predetermined nominal spacing (NMS) to said scheduled uplink frequency band (SUB) based on the center of the scheduled uplink frequency band (SUB) and the scheduled downlink frequency band (SDB), determining if the scheduled downlink frequency band (SDB) protrudes a supported downlink frequency band (SDFB) by calculating a spacing of the scheduled downlink frequency band (SDB) from the scheduled uplink frequency band (SUB) while considering the capable downlink frequency bandwidth (CBW) of the reduced-capability user equipment and the predetermined nominal spacing (NMS), and amending the scheduling by shifting the scheduled downlink frequency band (SDB) protruding the supported downlink frequency band (SDFB) to the edge of the supported downlink frequency band (SDFB) relative to the scheduled uplink frequency band (SUB) such that a spacing between the scheduled uplink frequency band (SUB) and the shifted scheduled downlink frequency band (SDB) differs from the predetermined nominal spacing (NMS) and such that the whole scheduled downlink frequency band (SDB) is within the supported downlink frequency band (SDFB).

2. The method according to claim 1, wherein said step of transmitting the at least one first downlink signal comprises indicating the scheduled downlink frequency band (SDB), and transmitting within said scheduled downlink frequency band said assignment (UA) to the scheduled uplink frequency band (SUB).

3. The method according to claim 1, wherein the step of transmitting the at least one first downlink signal is carried out:

according to a predetermined proximity around a master information block (MIB), or as announced by the base station (BS) in a broadcast signalling, or in a fraction of the supported downlink frequency band (SDFB) identified by a hopping sequence considering a user equipment specific element, or in a fraction of the supported downlink frequency band (SDFB) identified by a hopping sequence considering a frame timing relation.

4. The method according to claim 1, wherein in case of operation of the base station (BS) in time domain duplex, the predetermined nominal spacing (NMS) is zero.

5. The method according to claim 3, further comprising that after conducting an uplink transmission considering said scheduled uplink frequency band (SUB) a second scheduled downlink frequency band (SDB) is determined considering at least one of:

said predetermined proximity around the master information block (MIB), said broadcast signalling, said fraction of the supported downlink frequency band (SDB) identified by said hopping sequence, previously used scheduled downlink frequency band (SDB).

6. A base station (BS) that is part of a cellular network, the base station (BS) is configured to serve a plurality of user equipments, the base station (BS) operating at least in one supported uplink frequency band in uplink direction (SUFB) and one supported downlink frequency band in downlink direction (SDFB), wherein the plurality of user equipments comprises at least one which is qualified as reduced-capability user equipment, wherein the base station (BS) is configured to ascertain capability information from said reduced-capability user equipment (UE), the capability information indicating a capable uplink frequency bandwidth and a capable downlink frequency bandwidth (CBW), wherein for scheduling the at least one reduced-capability user equipment (UE) the base station (BS) is configured to:

transmit at least one first downlink signal for said user equipment (UE) considering the received capability information indicating an assignment (UA) to a scheduled uplink frequency band (SUB), schedule information in a scheduled downlink frequency band (SDB) for synchronously transmission in a predetermined nominal spacing (NMS) to said scheduled uplink frequency band (SUB) based on the center of the scheduled uplink frequency band (SUB) and the scheduled downlink frequency band (SDB), determine if the scheduled downlink frequency band (SDB) protrudes a supported downlink frequency band (SDFB) by calculating a spacing of the scheduled downlink frequency band (SDB) from the scheduled uplink frequency band (SUB) while considering the capable downlink frequency bandwidth (CBW) of the reduced-capability user equipment and the predetermined nominal spacing (NMS), and amend the schedule by shifting the scheduled downlink frequency band (SDB) protruding the supported downlink frequency band (SDFB) to the edge of the supported downlink frequency band (SDFB) relative to the scheduled uplink frequency band (SUB) such that a spacing between the scheduled uplink frequency band (SUB) and the shifted scheduled downlink frequency band (SDB) differs from the predetermined nominal spacing (NMS) and such that the whole scheduled downlink frequency band (SDB) is within the supported downlink frequency band (SDFB).

7. The base station (BS) according to claim 6, wherein said transmitting of the at least one first downlink signal comprises indicating the scheduled downlink frequency band (SDB), and to transmiting within said scheduled downlink frequency band (SDB) said assignment (UA) to the scheduled uplink frequency band (SUB).

8. The base station (BS) according to claim 6, wherein said transmitting of the at least one first downlink signal is carried out:

according to a predetermined proximity around a master information block (MIB), or as announced by the base station (BS) in a broadcast signalling, or in a fraction of the supported downlink frequency band (SDFB) identified by a hopping sequence considering a user equipment (UE) specific element, or in a fraction of the supported downlink frequency band (SDFB) identified by a hopping sequence considering a frame timing relation.

9. The base station (BS) according to claim 8, further configured that after conducting an uplink transmission considering said scheduled uplink frequency band (SUB) to determine a second scheduled downlink frequency band (SDB) considering at least one of:

said predetermined proximity around the master information block (MIB), said broadcast signalling, said fraction of the supported downlink frequency band (SDFB) identified by said hopping sequence, previously used scheduled downlink frequency band (SDB).

10. A method for operating a user equipment (UE) capable of operating with one of a plurality of base station (BS) of a cellular network (CN), hereinafter the serving base station, said user equipment (UE) being qualified as a reduced-capability user equipment, said user equipment (UE) maintaining a capable uplink frequency bandwidth and a capable downlink frequency bandwidth (CBW), the method comprising the steps of, by the user equipment:

submitting capability information to the serving base station (BS), receiving at least one first downlink signal from the serving base station (BS), deriving from the first downlink signal an assignment (UA) to a scheduled uplink frequency band (SUB), determining a scheduled downlink frequency band (SDB) by considering a predetermined nominal spacing (NMS) to a center of the scheduled uplink frequency band (SUB) and the scheduled downlink frequency band (SDB), synchronously monitoring the scheduled downlink frequency band (SDB) for signals from the base station (BS) and transmitting at least one signal to the base station (BS) using the scheduled uplink frequency band (SUB), and determining if the scheduled downlink frequency band (SDB) protrudes a supported downlink frequency band (SDFB) by calculating a spacing of the scheduled downlink frequency band (SDB) from the scheduled uplink frequency band (SUB) while considering the capable downlink frequency bandwidth (CBW) of the reduced-capability user equipment and the predetermined nominal spacing (NMS), and shifting the scheduled downlink frequency band (SDB) protruding the supported downlink frequency band (SDFB) to the edge of the supported downlink frequency band (SDFB) relative to the scheduled uplink frequency band (SUB) such that a spacing between the scheduled uplink frequency band (SUB) and the shifted scheduled downlink frequency band (SDB) differs from the predetermined nominal spacing (NMS) and such that the whole scheduled downlink frequency band (SDB) is within the supported downlink frequency band (SDFB).

11. The method according to claim 10, wherein the step of receiving said at least one first downlink signal, is carried out:

according to a predetermined proximity around a master information block (MIB), or as announced by the base station (BS) in a broadcast signalling, or in a fraction of the supported downlink frequency band (SDB) identified by a hopping sequence considering a user equipment (UE) specific element.

12. The method according to claim 11, further comprising after conducting an uplink transmission considering said scheduled uplink frequency band (SUB) the step of determining a second scheduled downlink frequency band (SDB) considering at least one out of:

said predetermined proximity around the master information block (MIB), said broadcast signalling, said fraction of the supported downlink frequency band (SDFB) identified by said hopping sequence, previously used scheduled downlink frequency band (SDB).

* * * * *